United States Patent [19]

Suspene

[11] Patent Number: 5,731,035
[45] Date of Patent: Mar. 24, 1998

[54] PROCESS FOR MAKING A PAINTABLE POLYMER ARTICLE

[75] Inventor: Laurent Gerard Suspene, Bilbao Vizcaya, Spain

[73] Assignee: Cook Composites and Polymers, North Kansas City, Mo.

[21] Appl. No.: 704,298

[22] Filed: Sep. 18, 1996

Related U.S. Application Data

[60] Provisional application No. 60/004,171 Sep. 22, 1995.

[51] Int. Cl.$^6$ ............................................. B05D 3/12
[52] U.S. Cl. ................................. 427/296; 427/393.5
[58] Field of Search ............................ 427/296, 393.5

[56] References Cited

U.S. PATENT DOCUMENTS

| | | | |
|---|---|---|---|
| 2,772,185 | 11/1956 | Dempster | 117/102 |
| 3,645,231 | 2/1972 | Barrett | 118/50.1 |
| 3,672,942 | 6/1972 | Neumann et al. | 117/62.2 |
| 3,701,748 | 10/1972 | Kroekel | 260/40 |
| 3,721,579 | 3/1973 | Barrett | 170/93.31 |
| 3,855,031 | 12/1974 | McNeely et al. | 156/190 |
| 3,969,552 | 7/1976 | Malofsky et al. | 427/295 |
| 3,972,969 | 8/1976 | Rio et al. | 264/42 |
| 4,021,256 | 5/1977 | Oda | 106/74 |
| 4,057,461 | 11/1977 | Richter | 162/19 |
| 4,069,378 | 1/1978 | DeMarco | 526/328 |
| 4,144,836 | 3/1979 | Bernath | 118/7 |
| 4,147,821 | 4/1979 | Young | 427/295 |
| 4,165,400 | 8/1979 | DeMarco | 427/295 |
| 4,384,014 | 5/1983 | Young | 427/294 |
| 4,416,921 | 11/1983 | Dunn | 427/353 |
| 4,479,912 | 10/1984 | Bullock | 264/23 |
| 4,479,986 | 10/1984 | Juday | 427/295 |
| 4,482,933 | 11/1984 | Alexander | 361/321 |
| 4,520,545 | 6/1985 | Moraly | 29/412 |
| 4,522,978 | 6/1985 | Gardner | 525/48 |
| 4,525,337 | 6/1985 | Jamet et al. | 423/449 |
| 4,525,498 | 6/1985 | Atkins et al. | 523/511 |
| 4,632,945 | 12/1986 | Garcia et al. | 523/176 |
| 4,655,610 | 4/1987 | Al-Jaroudi | 384/13 |
| 4,942,013 | 7/1990 | Palmer et al. | 264/511 |
| 4,963,396 | 10/1990 | Ito et al. | 427/294 |
| 5,019,426 | 5/1991 | Noe et al. | 427/314 |
| 5,082,878 | 1/1992 | Bansleben et al. | 523/203 |
| 5,087,490 | 2/1992 | Ito et al. | 428/34.1 |
| 5,098,743 | 3/1992 | Juday | 427/295 |
| 5,104,983 | 4/1992 | Stock et al. | 524/141 |
| 5,202,366 | 4/1993 | Reid et al. | 523/516 |
| 5,212,233 | 5/1993 | Juday | 525/36 |
| 5,236,553 | 8/1993 | Richter | 162/237 |
| 5,256,450 | 10/1993 | Catena | 427/295 |
| 5,281,388 | 1/1994 | Palmer et al. | 264/571 |
| 5,306,370 | 4/1994 | Herko et al. | 156/528 |
| 5,341,561 | 8/1994 | Schorm et al. | 29/596 |
| 5,376,721 | 12/1994 | McGarry et al. | 525/64 |
| 5,386,963 | 2/1995 | Nasvik | 249/16 |
| 5,399,621 | 3/1995 | Kohlhammer | 525/263 |
| 5,401,803 | 3/1995 | Rex | 525/170 |
| 5,420,179 | 5/1995 | Fourquier et al. | 523/523 |

FOREIGN PATENT DOCUMENTS

| | | |
|---|---|---|
| 91/76416 | 8/1991 | Australia. |
| 413085 | 2/1991 | European Pat. Off.. |
| 414468 | 2/1991 | European Pat. Off.. |
| 438814 | 7/1991 | European Pat. Off.. |
| 560113 | 9/1993 | European Pat. Off.. |
| 600478 | 6/1994 | European Pat. Off.. |
| 2278117 | 5/1993 | United Kingdom. |
| 92/01727 | 7/1990 | WIPO. |
| 95/09202 | 8/1993 | WIPO. |

OTHER PUBLICATIONS

D.R. Paul et al., Eds., *Polymer Blends*, vol. II, Chapter 23 by K. E. Atkins, New York Academic Press, p. 391 et seq. (1978).

"Impregnation: An Overview", Imprex, Inc., Marketing Literature, Copyright 1988.

*Primary Examiner*—Erma Cameron
*Attorney, Agent, or Firm*—Whyte Hirschboeck Dudek S.C.

[57] ABSTRACT

A process for making a paintable polymer article is described which comprises impregnating a polymeric substrate having a plurality of pores, the pores having a number average pore cross-section of less than 50 square microns, with a liquid sealant having a viscosity less than 25 kPa.s and heating the impregnated polymeric substrate to cure the sealant. The paintable polymer article may be coated with a paint to form a painted polymer article. The inventors have found that this invention helps prevent paint popping due to the expansion of solvents trapped in voids in the polymer article during paint drying or curing operations, particularly paint popping caused by voids in the polymer article which are exposed by cutting or trimming the polymer article after compression molding.

12 Claims, No Drawings

PROCESS FOR MAKING A PAINTABLE POLYMER ARTICLE

This application claims the benefit of U.S. Provisional Application No. 60/004,171: filed on Sep. 22, 1995.

FIELD OF THE INVENTION

The present invention pertains to processes for making composite articles. In particular, the present invention relates to composite articles having a paintable polymeric surface having improved physical properties.

BACKGROUND OF THE INVENTION

Reinforced resins are commonly used today in the manufacture of such products as automobile or truck bodies, chairs, heater housings, trays, etc. Advantages of such products over corresponding products made of metal include light weight, high strength to weight ratio, resistance to corrosion, and part design flexibility. Typical examples are the various fiber reinforced unsaturated polyester resins. A problem which occurs with fiber reinforced polyester resins is that in some applications, such as the manufacture of automobile body parts, the rough surface obtained with a conventional fiber reinforced polyester resin is not acceptable.

The rough surface is attributed, at least in part, to the shrinkage in volume of the polymer relative to the reinforcing material as the resin polymerizes. One approach that has been used to try to eliminate surface roughness is to use low-profile additives, such as disclosed in U.S. Pat. Nos. 3,701,748; 4,525,498; 5,082,878; 5,202,366; 5,376,721; 5,386,963; and 5,401,803; European Patent Applications 413,085; 414,488; 438,814; 580,113; and 600,478; Australian Patent 91/76,416; British Patent 2,278,117 and International Patent Applications WO 92/01727 and WO 95/09202, all of which are incorporated by reference for their relevant disclosures as if fully set forth herein. Low-profile additives are generally thermoplastic materials which reduce shrinkage through what is believe to be a complex mechanism of incompatibility between the thermoplastic resin and the matrix resin resulting in phase separation which, upon cooling of the polymer, creates microscopic voids and/or microscopic cracks in the composite that compensate for the above-mentioned volumetric shrinkage of the matrix resin during polymerization. This is explained in more detail by K. E. Atkins in *Polymer Blends* edited by D. R. Paul and S. Newman, New York Academic Press.; Volume 2, Page 391 (1978), which is incorporated herein by reference for its relevant disclosure as if fully set forth herein. These micro voids and micro cracks cause the surface of the resulting reinforced resin to be porous due to the intersection between some of those voids and cracks with the surface of the composite. Those pores cause problems during the painting process, because the solvents used in the paint penetrate the pores when the paint is applied and then during the paint curing cycle (which generally includes heating the paint) the solvent trapped in the pores expands, causing the paint to "pop" at the surface of the part, causing surface defects. The craters and pin holes caused by paint popping need to be sanded and repainted, which are expensive and labor-intensive steps and which can expose more pores.

This latter problem is particularly noticeable at the edges of the part where the part has been trimmed after molding to remove excess resin, because trimming exposes more pores which would have otherwise been hidden below the surface as voids. This phenomenon of increased paint popping is often called "edge popping". One approach that is used to try to eliminate paint popping is to use the in-mold coating process (IMC) in which additional resin is injected over the molded part while it is still in the mold by releasing some of the pressure on the mold and injecting additional resin under pressure. This, however, does not solve the problem of "edge popping", because the part generally still needs to be trimmed after it is removed from the mold. Therefore there continues to be a need for a method to solve these problems.

SUMMARY OF THE INVENTION

The present invention solves the problem of surface defects due to paint popping through a process for making a paintable polymer article comprising a) impregnating a polymeric substrate having a plurality of pores, the pores having a number average pore cross-section of, less than 50 square microns, with a heat curable sealant having a viscosity less than 25 kPa.s and b) heating the impregnated polymeric substrate to cure the heat curable sealant.

DETAILED DESCRIPTION OF THE INVENTION

The expression "polymeric substrate" is defined herein to mean any substrate comprising a solid polymeric component which has at least one surface bearing a plurality of pores. In a preferred embodiment, the polymeric substrate comprises a polymer, a reinforcing material, and a low profile additive, wherein the polymer preferably comprises unsaturation in the form of double bonds, such as an unsaturated polyester or vinyl ester.

In another preferred embodiment, the polymeric substrate comprises a hollow filler such as glass or polymeric microspheres, preferably having an internal void diameter less than 200 microns, more preferably less than 100 micron and even more preferably less than 50 microns, and at least one surface of the polymeric substrate has a plurality of open filler in the form of blind pores. The source of these blind pores can vary, but typically these pores are the result of cutting or abrading the surface of the polymeric substrate. The substrate optionally may contain reinforcing fiber.

In either embodiment, preferred reinforcing materials include a reinforcing fiber, such as glass fiber, graphite fiber, carbon fiber, synthetic fiber such as Kevlar™, etc. Fiber reinforced molding compounds having a polyester matrix resin are particularly preferred, such as those disclosed in U.S. Pat. No. 4,525,498, which is incorporated by reference as if fully set forth herein.

The term "pore" as defined herein is a void in the polymeric substrate which intersects with the surface of the substrate so as to form an opening in the surface of the substrate. Blind pores, i.e., pores which intersect with the surface of the material at one location, and through pores, i.e., pores which intersect With the surface of the material at more than one location so that it forms a passageway through the material, are included in this definition. The term "void" as used herein denotes a three-dimensional space in the polymeric substrate matrix resin in which there is an absence of solid or semi-solid material. This term includes cracks in the matrix resin. The polymeric substrate matrix resin preferably has a percent void volume less than 5 percent, more preferably less than 1 percent, of the total volume of the polymeric substrate. The void volume includes voids which do not intersect with the surface of the polymeric substrate. The percent void volume may be determined by calculation:

% void volume=[(Volumetric shrinkage of the resin)×(resin content of the substrate)+(weight fraction hollow filler)×(weight average void volume of hollow filler)]×100.

The volumetric shrinkage of the resin is obtained by measuring the density difference between the liquid resin and the solid/cured resin.

The expression "number average pore cross-section" is defined herein to equal the total area on the surface of the polymeric substrate occupied by the pores in that surface area divided by the number of pores occupying the same surface area. The polymeric substrate according to the present invention has a plurality of pores having a number average pore cross-section less than 50 microns, preferably less than 30 square microns, preferably less than 5 square microns and more preferably less than 1 square micron. There is no particular lower limit to the number average pore cross-section other than that the pores be large enough to allow impregnation of the heat curable sealant into the pores having average pore size. The number average pore cross-section may be determined using Scanning Electron Microscopy as explained by V. A. Pattison et al., J. Appl. Polym. Sci., 18:2763 (1974), which is incorporated by reference for its relevant disclosure as if fully set forth herein.

The heat curable sealant may be any polymerizable or crosslinkable liquid composition which is heat curable and has an intrinsic viscosity less than 25 kPa.s, preferably less than 20 kPa.s and more preferably less than 15 kPa.s (1 kPa.s=1 cps) Preferably, the heat curable sealant undergoes less than 10% volumetric shrinkage during cure.

In a preferred embodiment, the heat curable polymeric composition comprises (1) an emulsifiable unsaturated polyester; (2) a monofunctional (meth)acrylic monomer and (3) a polyfunctional (meth)acrylic monomer. The unsaturated polyester is preferably present in an amount from 1 to 20 weight percent, more preferably in the range from 5 to 15 weight percent. The monofunctional (meth)acrylic monomer is preferably present in an amount up to 98 weight percent, preferably in the range from 25 to 55 weight percent. The polyfunctional (meth)acrylic monomer is preferably present in an amount from 1 to 80 weight percent, preferably in the range from 40 to 60 weight percent.

The unsaturated polyester component (1) of the above sealant compositions is a water emulsifiable unsaturated polyester resin reactive with the acrylate monomers of components (2) and (3), and optionally (4), to form a cross-linked solid upon curing or polymerization of the liquid sealant. A suitable polyester is Stypol® 72-0802 which is available from Cook Composites and Polymers Company.

Polymerizable monofunctional methacrylate and acrylate monomers suitable for component (2) of the above sealant compositions are monomers of the type formula

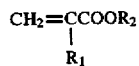

in which $R_1$ is H or $CH_3$, and $R_2$ is $C_nH_{2n+1}$ or $C_nH_{2n}OH$ in which n is an integer of 1 to about 20, preferably 2 to 12. Exemplary monomers of the above type formula are methylmethacrylate, ethyl methacrylate, propyl methacrylate, isobutyl methacrylate, methyl acrylate, butyl acrylate, hydroxypropyl methacrylate, hydroxypropyl acrylate and lauryl methacrylate. Compounds of this type are available commercially from a number of chemical companies.

Polyfunctional monomers suitable for component (3) are the dimethacrylate and diacrylate esters formed by the reaction of methacrylic acid or acrylic acid, or their anhydrides, and triethylene glycol tripropylene glycol or tetraethylene glycol. Exemplary monomers of this type include triethylene glycol dimethacrylate, tetraethylene glycol dimethacrylate, and tetraethylene glycol diacrylate. Compounds of this type are commercially available from a number of chemical companies.

Polyfunctional monomers suitable as optional component (4) are the dimethacrylate and diacrylate esters formed by the reaction of methacrylic acid or acrylic acid, or their anhydrides, and ethylene glycol, 1,2- or 1,3-propylene glycol, neopentyl glycol, and 1,3- or 1,4-butylene glycol. Exemplary monomers include ethylene glycol dimethacrylate, butanediol dimethacrylate, and neopentylglyool diacrylate. Compounds of this type are known to enhance the heat and chemical resistance of the cured sealant. They are available commercially from a number of chemical companies. They are preferably present in an amount from 0 to 20, more preferably 10 to 15, wt. % of the liquid sealant.

The liquid sealant may also contain dicyclopentenyloxyethyl methacrylate acrylate which is of the type formula

in which $R_1$ is H or $CH_3$. Compounds of this type are known to increase the heat resistance of the cured sealant. They are available commercially from Rohm and Haas under their tradenames Rocryl® 57,672 and 657T and consist of high molecular weight liquids (MW=262, 248 and 262 respectively) with a specific gravity of 1.064, 1.085 and 1.064 respectively. They are preferably present in an amount in the range from 0 to 15, more preferably from 5 to 15, wt. %.

The sealants generally include an inhibitor when formulated for shipment to an end user. The inhibitor is included to prevent premature polymerization of the sealant and provide a stable sealant with acceptable shelf life. Suitable inhibitors include quinones, hydroquinones or phenols and substituted phenols. A small amount of inhibitor, such as about 0.01% to 2%, is generally sufficient; about 0.1% to 0.4% of inhibitor typically gives satisfactory results.

A catalyst is mixed with the liquid sealant by the end user at the time a sealant is added to the impregnation tank or reservoir tank of impregnation apparatus. Many catalysts are suitable, such as benzoyl peroxide, methyl ethyl ketone peroxide, alkyl peresters, cumene hydroperoxide, or an azonitrile such as, for example, 2,1'-azo (isobutyronitrile) identified herein as AZBN. The sealants need contain only a small amount of the selected catalyst, such as in the range from about 0.03 to 1 wt. %.

The liquid sealants also may include a surfactant as an optional ingredient to assist in the washability or rinsability of excess uncured sealant from an article prior to curing. Sealants may include from 0% to about 4% of surfactant. Many types of anionic and nonionic surfactants, or mixtures thereof can be added. Examples of suitable anionic surfactants include sodium alkyl and akylaryl sulfates, petroleum sulfonates and sulfonated ethoxylated surfactants; examples of suitable nonionic surfactants include ethoxylated alcohols, linear or branched ethoxylated alkyl phenols and polyoxyethylene and polyoxypropylene glycols and esters. Appropriate surfactants are available commercially from a number of companies under various tradenames such as, for example, E. I. Du Pont de Nemours & Co. (Alkanol® and Duponol®), Union Carbide Corp. (Tergitol®), Shell Chemical Co. (Neodol®), GAF Corp. (Alipal® and Igepal®), Rohm & Haas Co. (Triton®), and ICI (Tween®).

Another optional element is a dye, preferably a fluorescent dye, to provide for visual inspection of cured sealant. The sealants may include from 0 to about 1% of dye, although only a small amount is needed, such as about 0.01 to 0.05%.

Suitable sealants are described in U.S. Pat. Nos. 2,772,185; 4,147,821; 4,416,921; 5,098,748; and 5,212,233, the relevant disclosures of which are incorporated by reference as if fully set forth herein.

The step of impregnating the polymer substrate may be carried out by any process and apparatus known in the art for impregnating a liquid into a porous solid. One approach is to use the "dry vacuum-pressure" method in which the article is placed in a closed vessel and the vessel is subjected to a vacuum (such as 2 to 10 Torr for 10 to 15 minutes or more) to cause air trapped in any pores in the dry article to escape. The sealant is drawn from a reservoir into the vessel so as to cover and fill the pores of the article. The vacuum is then released and pressure is applied to the sealant (such as air at 100 psi for 10 to 15 minutes or more) to drive the sealant further into the pores. Following this, the excess sealant is drained, the parts rinsed, and the sealant is polymerized, i.e. cured, to fill the pores with solid material.

Another impregnation method is the "dry vacuum" process in which the articles are placed in a closed vessel and the vessel is subjected to a vacuum as in the "dry vacuum-pressure" method. The articles are then submerged in or flooded by the liquid polymerizable composition so as to cover the articles and fill the pores for 10 to 15 minutes or more at atmospheric pressure, after which the excess polymerizable composition is drained, the articles are rinsed and the polymerizable composition is polymerized to fill the pores with solid material. An apparatus which may be used to carry out the "dry vacuum" process is described in U.S. Pat. No. 4,479,986, the disclosure of which is incorporated by reference as if fully set forth herein.

Another approach for impregnation of the polymeric substrate is the "wet vacuum" process which includes the steps of submerging the article in the bath of liquid sealant in an enclosed impregnation tank, and then evacuating the tank to a sufficiently low vacuum (e.g. 2 to 10 Torr for 10 to 15 minutes or more) to enable most of the air entrapped in the pores in the polymeric substrate to escape so that the pores can be filled with the liquid polymerizable composition. The vacuum in the impregnating tank is then released, the articles are drained and rinsed, and the sealant is cured. Typically, the articles are transferred to a tank in which the excess sealant is allowed to drain off. The articles are also generally transferred to another tank in which they are rinsed with water and/or detergent in order to wash off excess sealant. The articles are then transferred to a curing station to polymerize or cure the solid material to fill the pores.

Yet another approach is the "dry vacuum-wet vacuum" process which includes the steps of placing the article in a closed vessel, subjecting the vessel to a vacuum (e.g., 2 to 10 Torr for 10 to 15 minutes or more), submerging or flooding the article in the liquid sealant so as to cover the article and fill the pores, continuing to apply a vacuum (e.g. 2 to 10 Torr for 10 to 15 minutes or more), releasing the vacuum in the vessel, draining the excess sealant, rinsing the impregnated article, and curing the sealant.

Examples of applying the process of the present invention to make paintable composites with improved physical properties, along with a comparative example, are given below.

EXAMPLE 1

Heat curable polymerizable compositions were prepared and applied using the dry vacuum-pressure method to impregnate the polymer substrate. In each case, the polymer substrate was made as follows: a First Sheet Molding Compound was made by mixing the components in Table 1 below:

TABLE 1

First Sheet Molding Compound

| Material | | Parts by Weight |
|---|---|---|
| Unsaturated polyester resin | Stypol ® 040-3948[1] | 65.0 |
| Polyvinyl acetate | Neulon H[2] | 35.0 |
| Tertiary butyl perbenzoate | | 1.4 |
| Viscosity modifier | W995[3] | 1.5 |
| Zinc stearate | | 4.0 |
| Calcium carbonate | Camel Wite | 200.00 |
| p-Benzoquinone | | 0.02 |

[1]Cook Composites and Polymers
[2]Union Carbide
[3]BYK Chemie

This First Sheet Molding Compound is mixed with a magnesium oxide paste, Plasticolors PG 9033, as the Second Sheet Molding Compound, incorporating 30% glass by weight, using the sheet molding compound (SMC) process described in H. G. Kia, *Sheet Molding Compounds—Science and Technology* (Hansen/Gardner Publics.: 1993). After three days, the material was molded into sheets by compression molding at 300° F. for 2.5 minutes under 1000 psi pressure. The number average pore cross section on the resulting molded parts was 0.075 square microns with a void volume of 1.85%.

Impregnation of the panels corresponding to the Comparative Example and the Example of the Present invention was carried out as follows:

| Dry vacuum — pressure process: | | |
|---|---|---|
| Step 1 | Vacuum | 10 min./3 Torr |
| Step 2 | Resin Filling/vacuum | 10 min./3 Torr |
| Step 3 | Pressure | 10 min./90 psi |
| Step 4 | Rinse in room temp water | |
| Step 5 | Cure in 200° F. water for 15 minutes | |

The sealants used to treat the Comparative Example and the Example of the Present Invention were formulated as set forth in Table 2 below:

TABLE 2

Sealant Formulations

| | Parts by Weight | |
|---|---|---|
| Component | Comparative Example | Example of the Present Invention |
| Polyester[4] | 15 | 8 |
| HPMA[5] | 24 | 34 |
| TEGDMA[6] | 35 | 38 |
| DEGDMA[7] | — | 11.5 |
| DCPOEMA[8] | 25 | 5 |
| Viscosity (kPa · s) | 35 | 15 |

TABLE 2-continued

Sealant Formulations

| | Parts by Weight | |
|---|---|---|
| Component | Comparative Example | Example of the Present Invention |

[4]Water emulsifiable polyester resin designated Stypol® 72-0802 (see above)
[5]HPMA = hydroxypropyl methacrylate
[6]TEGDMA = triethylene glycol dimethacrylate
[7]DEGDMA = diethylene glycol dimethacrylate
[8]DCPOEMA = dicyclopentenyloxyethyl methacrylate The Example of the Present Invention and the Comparative Examples were tested for relative porosity by marking each sample with an indelible marker (Sanford's overhead projector pen), allowing the marker to dry, and then wiping each sample with acetone. An untreated panel was used as the Control. The Control and the Comparative Example remained stained after wiping with acetone, indicating that they contained porosity retaining the indelible marker ink below the surface, whereas the Example of the Present Invention, wiped completely clean with acetone, indicating that the porosity had been eliminated. This shows that the present invention prevents the occurance of a major source of the paint popping problem.

The Example of the present invention, the Comparative Example, and the Control were tested for paint pops in a side-by-side comparison. Each panel was painted with a standard automotive polyurethane automotive paint. The Control exhibited numerous paint pops both on the flat area of the panel as well as on the trimming area, i.e., the edge. The Comparative Example exhibited a few paint pope on the edge while the Example of the Present Invention did not have any paint pops.

The inventor has also found that the present invention provides an unexpected improvement in certain physical properties of the polymeric substrate, particularly in regard to flexural modulus and flexural strength, while maintaining other physical properties, such as tensile modulus and tensile strength. Tensile modulus and tensile strength properties were measured according to American Society for Testing and Materials (ASTM) procedure D638, flexural modulus and flexural strength properties were measured according to ASTM procedure D790, and the Izod and Notched Izod impact strength properties were measured according to ASTM procedure D256. ASTM procedures D638, D790, and D256 are incorporated by reference as if fully set forth herein. The data is presented in Table 3 below.

TABLE 3

Comparison of Physical Properties

| Physical Property | Control | Comparative Example | Example of the Present Invention |
|---|---|---|---|
| Tensile Modulus (kpsi) | 1310 (±110) | 1350 (±110) | 1290 (±70) |
| Tensile Strength (psi) | 8300 (+1000) | 10500 (±1000) | 10700 ± (1000) |
| Elong. (2/2) | 1.1 (±0.2) | 1.4 ± (0.2) | 1.4 (±0.2) |
| Energy (lbs./in.) | 6.2 (±2.0) | 10.1 (±2.0) | 10.4 (±3.0) |
| Flexural Modulus | 1300 (±100) | 1210 (±80) | 1400 (±90) |
| Flexural Strength | 22750 (±300) | 21890 ± (1800) | 28250 ± (2300) |
| Energy (lbs./in) | 9 (±1.5) | 9.8 (±2.5) | 11 (±1) |
| Izod | 15 ± 3 | 14 ± 2 | 13 ± 2 |
| Notched Izod | 18 ± 1 | 16 ± 2 | 13 ± 2 |
| % Glass | 22.6 | 23.0 | 23.5 |
| % Resin | 27.1 | 26.8 | 26.6 |
| % Filler | 50.4 | 50.2 | 49.9 |

EXAMPLE 2

Heat curable polymerizable compositions were prepared and applied using the dry vacuum-wet vacuum method to impregnate the polymer substrate. The polymer substrates were made as follows: A First Sheet Molding Compound was made by mixing the components of Table 4

TABLE 4

First Sheet Molding Compound

| | | Parts by Weight | |
|---|---|---|---|
| Material | | Formulation #1 | Formulation #2 |
| Unsaturated Polyester | Stypol 040-3948[(1)] | 70 | 70 |
| Resin (Polyvinyl Acetate) | Neulon H[(2)] | 30 | 30 |
| Resin (Saturated Polyester) | 044-8012[(3)] | 10 | 0 |
| Viscosity Modifier | W995[(3)] | 1.67 | 1.67 |
| P-Benzoquinone | | 0.05 | 0.05 |
| Tertiary Butyl Perbenzoate | | 1.25 | 1.25 |
| Zinc Stearate | | 4.0 | 4.0 |
| Calcium Carbonate | Camel Fil | 155 | 165 |

[(1)]Cook Composites and Polymers
[(2)]Union Carbide
[(3)]BYK Chemie

The First Sheet Molding Compound is mixed with magnesium hydroxide (Marinco H), as the Second Sheet Molding Compound, incorporating 20% glass by weight, using the SMC process described in Example 1. After thickening, the material was molded into substrates by compression at 149° C. (300° F.) for 3 to 9 minutes under 1720–7420 kPa.s (250–1000 psi). Substrates contained surface defects ranging from cracks less than 2.5 microns in width and pores averaging 5–10 microns in diameter. Each substrate was machined in half. One half of each substrate was impregnated using the sealant described in Table 5 and the dry vacuum-wet vacuum process as follows:

| Dry Vacuum — Wet Vacuum | | |
|---|---|---|
| Step 1 | Vacuum | 10 min./3 Torr |
| Step 2 | Immersion/Vacuum | 15 min./3 Torr |
| Step 3 | Rinse in room temp. water | |
| Step 4 | Cure in 121° C. (250° F.) oven for 20 minutes | |

The sealant used to treat the substrates was formulated as set forth in Table 5.

TABLE 5

Sealant Formulation

| Component | Wt. % |
|---|---|
| Polyester Solids[3] | 10.12 |
| HPMA | 59.84 |

TABLE 5-continued

Sealant Formulation

| Component | Wt. % |
|---|---|
| TEGDMA | 19.75 |
| DEG[1] | 5.98 |
| DCPOEMA | 1.00 |
| DTBPC[2] | 0.30 |
| Hydroquinone | 0.01 |
| Polyoxyethylene (20) Sorbitan | 3.00 |
| Viscosity (kPa · s) | 22 |

[1] DEG = diethylene glycol
[2] DTBPC = ditertiary — 2,6-butyl-para-cresol
[3] Water emulsifable polyester resin designated Stypol 072-0802

The sealant was catalyzed with 0.4% by weight (based on resin) Vazo® 64 from E.I. Dupont de Nemours & Co.

The remaining half of each substrate was not impregnated and retained as a control. All substrates were painted with a standard automotive base coat and clear coat system. All substrates were visually and microscopically evaluated for paint defects occurring bet-ween tile substrate and base coat. The control (not impregnated) substrates contained an average of 59 defects/m$^2$ (5.5 defects/ft$^2$) of surface area. The impregnated substrates contained 16 defects/m$^2$ (1.5 defects/ft$^2$) of surface area.

Although the invention has been described in considerable detail through the preceding specific embodiments, it is to be understood that these embodiments are for purpose of illustration only. Many variations and modifications can be made by one skilled in the art without departing from the spirit and scope of the invention.

What is claimed is:

1. A process for making a paintable polymer article comprising:
    (a) impregnating a polymeric substrate having a plurality of pores, the pores having a number average pore cross-section of less than 50 square microns, with a liquid sealant having a viscosity less than 25 kPa.s and comprising:
        (i) an emulsifiable unsaturated polyester,
        (ii) a monofunctional (meth)acrylic monomer, and
        (iii) a polyfunctional (meth)acrylic monomer; and
    (b) heating the impregnated polymeric substrate to cure the sealant.

2. The process of claim 1 wherein the unsaturated polyester is present in an amount from 1 to 20 wt. %; the monofunctional (meth)acrylic monomer is present in an amount up to 98 wt. %; and the polyfunctional (meth)acrylic monomer is present in an amount from 1 to 80 wt. %.

3. The process of claim 1 wherein the monofunctional (meth) acrylic monomer is hydroxypropyl methacrylate.

4. The process of claim 1 wherein the polyfunctional (meth)acrylic monomer is triethylene glycol dimethacrylate.

5. The process of claim 1 wherein the liquid sealant further comprises dicyclopentyloxyethyl (meth)acrylate.

6. The process of claim 1 wherein the liquid sealant further comprises an inhibitor.

7. The process of claim 1 wherein a catalyst is mixed with the liquid sealant prior to impregnating the polymeric substrate.

8. The process of claim 1 wherein the impregnating is carried out using the wet vacuum method or the dry vacuum-wet vacuum method.

9. The process of claim 1 wherein the polymer article comprises a polymer resin and a reinforcing material.

10. The process of claim 9 wherein the polymer article further comprises hollow glass or polymeric microspheres.

11. The process of claim 1 further comprising cutting or trimming the polymer article prior to impregnating the polymeric article.

12. The process of claim 1 further comprising painting the paintable article with a paint.

* * * * *

UNITED STATES PATENT AND TRADEMARK OFFICE
CERTIFICATE OF CORRECTION

PATENT NO. : 5,731,035
DATED : March 24, 1998
INVENTOR(S) : Laurent Gerard Suspene It is certified that error appears in the above-identified patent and that said Letters Patent is hereby corrected as shown below:

Column 1, line 34, replace "414,488" with --414,468-- and replace "580,113" with --560,113--.

Column 2, line 57, replace "With" with --with--.

Column 3, lines 33, 34 and 40, replace "(moth)acrylic" with --(meth)acrylic--.

Column 4, line 16, replace "neopentylglyool" with --neopentylglycol--.

Column 4, line 51, replace "(isobutyronitrile)" with --bis(isobutyronitrile)--.

Column 5, line 19, replace "mere" with --more-- and replace "pares" with --pores--.

Column 5, line 57, replace "dosed" with --closed--.

Column 7, line 33, replace "pope" with --pops--.

UNITED STATES PATENT AND TRADEMARK OFFICE
CERTIFICATE OF CORRECTION

PATENT NO. : 5,731,035
DATED : March 24, 1998
INVENTOR(S) : Laurent Gerard Suspene It is certified that error appears in the above-identified patent and that said Letters Patent is hereby corrected as shown below:

Column 9, line 22, replace "bet-ween tile" with --between the--.

Signed and Sealed this

Twenty-ninth Day of September, 1998

*Attest:*

BRUCE LEHMAN

*Attesting Officer*     *Commissioner of Patents and Trademarks*